US011868304B1

(12) United States Patent
Tang et al.

(10) Patent No.: US 11,868,304 B1
(45) Date of Patent: Jan. 9, 2024

(54) AUTO-CONFIGURATION OF HARDWARE NON-LINEAR FUNCTION ACCELERATION

(71) Applicant: Meta Platforms, Inc., Menlo Park, CA (US)

(72) Inventors: Ping Tak Peter Tang, Fremont, CA (US); Nimit Singhania, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 229 days.

(21) Appl. No.: 17/479,534

(22) Filed: Sep. 20, 2021

(51) Int. Cl.
*G06F 15/76* (2006.01)
*G06F 16/22* (2019.01)
*G06N 3/08* (2023.01)
*G06N 3/04* (2023.01)

(52) U.S. Cl.
CPC .......... *G06F 15/76* (2013.01); *G06F 16/2282* (2019.01); *G06F 2015/763* (2013.01); *G06N 3/04* (2013.01); *G06N 3/08* (2013.01)

(58) Field of Classification Search
CPC ...... G06F 15/76; G06F 15/761; G06F 15/763; G06F 15/78; G06F 15/7821; G06F 9/3004; G06F 1/03; G06N 3/063; G06N 3/0481; G06N 3/082
See application file for complete search history.

(56) References Cited

U.S. PATENT DOCUMENTS

| | | | | |
|---|---|---|---|---|
| 11,106,430 B1* | 8/2021 | Kadkol | ................... | G06F 7/485 |
| 11,328,015 B2* | 5/2022 | Mangnall | .............. | G06F 7/5443 |
| 11,562,217 B2* | 1/2023 | Sun | ........................ | G06F 9/3004 |
| 2018/0060278 A1* | 3/2018 | Lin | ........................ | G06N 3/048 |
| 2021/0397928 A1* | 12/2021 | Chan | ........................ | G06F 7/544 |

* cited by examiner

*Primary Examiner* — Raymond N Phan
(74) *Attorney, Agent, or Firm* — Baker Botts L.L.P.

(57) ABSTRACT

In an embodiment, an example computer-implemented method for configuring a hardware accelerator to perform a non-linear function involves: determining a plurality of intervals that partition an input domain of the non-linear function; determining a plurality of subinterval configurations corresponding to different numbers of subintervals for partitioning that interval; generating an error set comprising an error for using a polynomial function to approximate the non-linear function within one or more corresponding subintervals specified by the subinterval configuration; using the error set and resource constraints, selecting one of the subinterval configurations for each of the intervals to generate a configuration set that minimizes a worst-case error across the intervals; selecting one of the subinterval configurations for each of the intervals to generate an improved configuration set that minimizes a cumulative error across the intervals without exceeding the worst-case error; and configuring the hardware accelerator based on the improved configuration set.

20 Claims, 6 Drawing Sheets

| binary intervals | minimax error for | | | |
|---|---|---|---|---|
| | $m=0$ | $m=1$ | $\cdots$ | $m=7$ |
| $\mathcal{I}_1$ | $e_{1,0}$ | $e_{1,1}$ | $\cdots$ | $e_{1,7}$ |
| $\mathcal{I}_2$ | $e_{2,0}$ | $e_{2,1}$ | $\cdots$ | $e_{2,7}$ |
| $\cdots$ | $\cdots$ | $\cdots$ | $\cdots$ | $\cdots$ |
| $\vdots$ | $\vdots$ | $\vdots$ | $e_{i,m}$ | $\vdots$ |
| $\cdots$ | $\cdots$ | $\cdots$ | $\cdots$ | $\cdots$ |
| $\mathcal{I}_D$ | $e_{D,0}$ | $e_{D,1}$ | $\cdots$ | $e_{D,7}$ |

AUTO-CONFIGURATION OF HARDWARE NON-LINEAR FUNCTION ACCELERATION

TECHNICAL FIELD

This disclosure generally relates to hardware configuration optimization to support machine learning, and in particular relates to automatic configuration of an application-specific integrated circuit (ASIC) or field-programmable gate array (FPGA) to support deep learning.

BACKGROUND

In machine learning processes, application-specific integrated circuits (ASICs) are sometimes used to accelerate inference workloads. An ASIC may comprise a plurality of processor elements comprising one or more CPU cores and one or more fixed-function units designed to accelerate matrix, embedding table, or non-linear activation function computations. But unlike the functions involved in matrix and embedding table computations, activation functions can take many forms. Thus, a fixed-function unit designed to accelerate non-linear activation function computations (i.e., a special function unit (SFU)) may be designed with the capability of approximating general non-linear (NL) functions. To improve the accuracy of these approximations, an SFU may comprise one or more configuration tables which may be optimized to compute a selected non-linear activation function which is currently in use in the machine learning process.

But configuring the configuration tables of an SFU to optimize for computational accuracy is nontrivial. Moreover, as soon as a new non-linear activation function is selected for use in the machine learning (e.g., deep learning) process, the SFU's configuration tables may need to be configured, once again, to optimize for the new function. This time-consuming, expensive, and repetitive process of optimizing an SFU's configuration tables can slow research and development (R&D) or reduce ASIC deployment flexibility. If a technical solution could be developed to effectively address the aforementioned issues, it would represent a significant advance in the state of the art.

SUMMARY OF PARTICULAR EMBODIMENTS

In particular embodiments, an ASIC or FPGA may comprise a configurable non-linear (NL) compute block, or SFU, which may support efficient approximation of many different non-linear functions. In embodiments, in various subintervals, a desired non-linear function may be approximated by the SFU using a polynomial of a finite number of specified degrees. For example, the polynomial may be a two-parameter linear model of the form (a+bx) or a four-parameter cubic model of the form $(a+bx)+x^2(c+dx)$. In an embodiment, a domain of the desired non-linear function may first be partitioned into disjoint subintervals. Then the model parameters of the chosen polynomial model function may be specified for each subinterval. In an embodiment, for the SFU to approximate a particular non-linear function accurately and efficiently, it may need to efficiently access a plurality of electronically stored sets of parameters for the chosen polynomial model function, said parameters optimized to reduce approximation error in the various subintervals. An overall approximation of the target non-linear function on an entire input domain may comprise a piecewise combination of a plurality of approximations tailored to a plurality of corresponding subintervals.

In embodiments, each binary interval of an input domain may be broken into subintervals, each subinterval defined by a pair of "breakpoints" corresponding to the bounds of that subinterval. In embodiments, each of the 64 unique (sgn, expo) of an FP 16 number may be used as breakpoints [FP16 numbers are digitally stored with 1 sign bit and 5 exponent bits; thus, there are $2^6=64$ different possible unique combinations of sgn, expo. In an embodiment, the following 65 values may therefore be used as breakpoints, defining 64 binary intervals: 0 and $\pm 2^n$ (where n=-15, -14, -13, ..., 0, ..., 14, 15, 16). In an embodiment, because an input number X where the nonlinear function needs to be evaluated at is in FP 16 format, X can be usefully decomposed into x+S, where S is the seed.

In an embodiment, an SFU of an ASIC or FPGA may comprise an Index Lookup Table (Index LUT) and a Main Lookup Table (Main LUT), these tables configured to store sets of model parameters, each set of model parameters corresponding to a particular subinterval. The Index LUT 210 may be a table containing rows of values, each row comprising index configuration parameters of the form {ndx, mmsb}; ndx may be an index number pointing to a specific row in the Main LUT; and, given an input number X that falls within a certain binary interval corresponding to ndx, mmsb may represent an amount of equal subinterval divisions of that binary interval. In embodiments, mmsb may be of the form m, denoting $2^m$ subdivisions are to be made in the binary interval in question. For example, m might equal 0, 1, 2, 3, 4, 5, 6, or 7. Each of the 8 possible values of m for a certain binary interval may represent a possible configuration for that interval. In embodiments, Index LUT has 64 rows, corresponding to the number of unique (sgn, expo) of an FP 16 number and further corresponding to the certain binary interval.

In an embodiment, the Main LUT may be a table containing rows of values, each row comprising model parameters of the form {a, b} [for linear modeling of non-linear functions] or {a, b, c, d} [for cubic modeling of non-linear functions]. Each row of the Main LUT may be configured with model parameters calculated to approximate a certain non-linear function in a single subinterval corresponding to that row. In an embodiment, the Main LUT has 256 rows and the Index LUT has 64 rows. The number of rows in the Main LUT and the Index LUT are a physical constraint of the implementation hardware. Ideally, each table would have an infinite (or at least very large) number of rows to facilitate more accurate approximations of the non-linear function by defining more intervals and subintervals. With many more rows specified in each of the lookup tables, the portion of the domain covered by various sets of polynomial model coefficients would then be smaller, leading to less approximation error. But using tables with a very large number of rows would be impractical at least due to limitations on the physical size and power-consumption budget of the implementing hardware. Thus, when determining an optimal configuration for a non-linear compute unit, physical resources and available table sizes must be considered. Therefore, the presently disclosed innovations are rooted in technology and present a technical solution to a practical hardware-based engineering problem, thereby improving the functioning of a special-purpose computing machine.

In embodiments, the architecture may be configured to approximate the non-linear function at an input number X (an FP 16 number) by first determining the subinterval that X falls within and a corresponding seed S, second computing x=X−S, third retrieving the corresponding coefficients (model parameters) of the local polynomial model corresponding to the subinterval that X falls within, and fourth evaluating that polynomial at X using x and the retrieved coefficients.

A novel method for automatic configuration of a non-linear compute unit or SFU of an ASIC or FPGA may be carried out by executing a series of optimization procedures in a multi-level structure to produce optimal configuration parameters for a desired non-linear function. In an embodiment, ASIC or FPGA hardware provides a baseline subdivision of an input domain I into subintervals $I_i$, i=1, 2, ..., I. For each $I_i$, the hardware may allow $m_i$ subdivision configurations. In other words, $I_i$ may be partitioned in one of $m_i$ ways into sets of disjoint subintervals. Thus, a subdivision configuration of the entire input domain may be determined by $\{(i, m_i|i=1, 2, \ldots, I\}$.

In an embodiment, further based on the ASIC or FPGA design, there may be a known cost (resource consumption) $c_{i,mi}$ for the choice of $m_i$ for $I_i$. The task of configuring a non-linear function may be defined as picking $m_i$ such that a total cost $$\sum_{i=1}^{I} c_{i,m_i} \leq C$$

stays within a budget C while some other properties are being optimized. These properties may relate to an accuracy of approximation of an implemented model function to a desired non-linear function (such as an activation function used in machine learning).

In an embodiment, a first stage of the novel automatic configuration method involves automatically generating a Cost-Error table. For each i=1, 2 ..., I a corresponding $c_{i,m_i}$ may first be obtained based on ASIC or FPGA design specifications. For each i and $m_i$, $I_i$ may be partitioned into $P_{m_i}$, a set (s, $[x_0, x_1]$) of breakpoints s and (disjoint) intervals $[x_0, x_1]$ per the ASIC or FPGA design. For each such tuple, a numerical optimization procedure may be employed to obtain an optimal polynomial approximation to the desired non-linear function by solving $$e^*_{(s,[x_0,x_1])} = \min_p \max_{x \in [x_0,x_1]} |p(x) - F(s+x)|$$

In an embodiment, the Cost-Error table is populated by linear programming of the model parameters using a Simplex Method. After solving the optimal polynomial approximation problem through the Simplex Method or by another method, then a Cost-Error table may be populated into ($c_{i,m_i}$, $e_{i,m_i}$), where $$e_{i,m_i} = \max_{(s,[x_0,x_1]) \in P_{m_i}} e^*_{(s,[x_0,x_1])}$$

In an embodiment, a second stage of the novel automatic configuration method involves automatically finding a feasible configuration that minimizes the worst-case error across the binary intervals, based on the populated Cost-Error table. In an embodiment, this second stage optimization procedure may be programmatically accomplished using binary search to solve a constrained optimization problem formulated as finding $m_1, m_2, \ldots, m_D$, to minimize $$E^*_1 = \min_{(i,m_i)} \max e_{i,m_i}$$

subject to $\sum_{i,m_i} c_{i,m_i} \leq C$ where 0 and mgxe$_{i,m_i}$ are the lower and upper bound of the optimal error, respectively. And midpoints of any such bounds can easily be programmatically determined to be a lower or upper bound using the Cost-Error table information, the bounds updated, and iterated.

In some instances, the optimal minimax configuration generated in the second stage may not exhaust the tablespace available in the ASIC or FPGA for storing coefficients. Thus, in an embodiment, a third stage of the novel automatic configuration method involves automatically optimizing the configuration such that while the minimax error remains E, the sum of max error of each binary interval is also minimized. In an embodiment, this third stage optimization procedure may be programmatically accomplished using dynamic programing to solve another constrained optimization problem. Let L(d, t) denote the solution of finding $m_1$, $m_2$, ..., and to minimize $$\sum_{i=1}^{d} e_{i,m_i}$$

subject to $$\max_{i=1}^{d} e_{i,m_i} \leq E$$

and $$\sum_{i=1}^{d} 2^{m_i} \leq t.$$

What is desired is L(D, T) and the arguments $m_i$, 1≤i≤D. First, L(1, t) may be solved for 1≤t≤T.

Then, L(i, s)=∞ may be defined for all s≤0, noting that $$\mathcal{L}(d, t) = \min_{m_d}\{e_{d,m_d} + \mathcal{L}(d-1, t - 2^{m_d})\}$$

subject to $e_{d,m_d} \leq E$.

Thus, at the end of stages one to three, the novel automatic configuration method may programmatically obtain an optimal configuration using only information related to the ASIC or FPGA resource constraints and allowable division configurations, together with a computer program configured to return an accurate F(x) [for the desired non-linear function] given an arbitrary input value x.

In an embodiment, once an ASIC or FPGA is configured according to the techniques described herein, it may be more effectively used in machine learning contexts. These contexts may include use in training a machine learning model, such as a deep learning model employing a non-linear activation function in the context of an artificial neural network (ANN). The trained machine learning model may then be used, for example, to determine a social-graph affinity coefficient of various social graph entities associated with to a social network. In an embodiment, the non-linear function may comprise one of a sigmoid function, a Swish function, a hyperbolic tangent (Tanh) function, a Gaussian Error Linear Unit (GELU) function, or a rectifier function.

Certain embodiments disclosed herein may provide one or more technical advantages. A technical advantage of the embodiments may include providing a quick method for automatically configuring the configuration tables of an SFU to optimize for computational accuracy in approximating a selected non-linear function, obviating the need to use the limited time and energy of experienced developers. Moreover, as soon as a new non-linear activation function is selected for use in a machine learning (e.g., deep learning) process, through using the novel systems and methods disclosed herein, the SFU's configuration tables may be quickly and easily reconfigured to optimize for the new function, once again saving time and money. By using the novel systems and methods described herein, the once time-consuming, expensive, and repetitive process of reconfiguring an SFU's configuration tables may no longer present a barrier to efficient R&D or reduce ASIC or FPGA deployment flexibility. The novel technical solutions described further herein represent a significant advance in the state of the art.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3 illustrates an example form of a Cost-Error table.

DESCRIPTION OF EXAMPLE EMBODIMENTS

Implementation Architecture

In an embodiment, an ASIC or FPGA may comprise a configurable non-linear (NL) compute block, or SFU, which may support efficient approximation of many different non-linear functions. In embodiments, the ASIC or FPGA may further comprise a plurality of processor elements, each processor element comprising at least one core and an SFU. In embodiments, some non-linear functions used as activation functions in machine learning contexts, such as the sigmoid function, the Swish function, the hyperbolic tangent (Tanh) function, the Gaussian Error Linear Unit (GELU) function, or the rectifier function may be more efficiently approximated by the SFU than by a more general compute block. Input numbers, corresponding to activation function inputs, which are processed by the SFU may be in a variety of formats, including the Int8 format, the FP 16 format, or another format. The FP 16 format is also known as a half precision number format or a 16-bit binary floating-point computer number format. In an embodiment, each interval or subinterval within the non-linear functions may be approximated by the SFU using a low-degree polynomial, such as a two-parameter linear model of the form (a+bx) or a four-parameter cubic model of the form $(a+bx)+x^2(c+dx)$.

In an embodiment, for the SFU to approximate a particular non-linear function accurately and efficiently, it may need to efficiently access parameters corresponding to the linear model approximation or cubic model approximation of the non-linear function, said parameters optimized to reduce approximation error. But there are not generally linear or cubic model parameters corresponding to a single model that effectively approximates a given non-linear function over an entire input domain. Thus, in an embodiment, floating-point arithmetic may be implemented in this context by breaking up an entire input domain into subintervals and applying different approximations to a target non-linear function on each of the smaller subintervals, each different approximation comprising a different sets of linear or cubic model parameters. An overall approximation of the target non-linear function on the entire input domain may thus comprise a piecewise combination of a plurality of approximations tailored to a plurality of corresponding subintervals. In an embodiment, the aforementioned subintervals may be equal subintervals of a plurality of binary intervals comprising an input domain, wherein each binary interval may not necessarily comprise the same number of subintervals.

Figure 1:
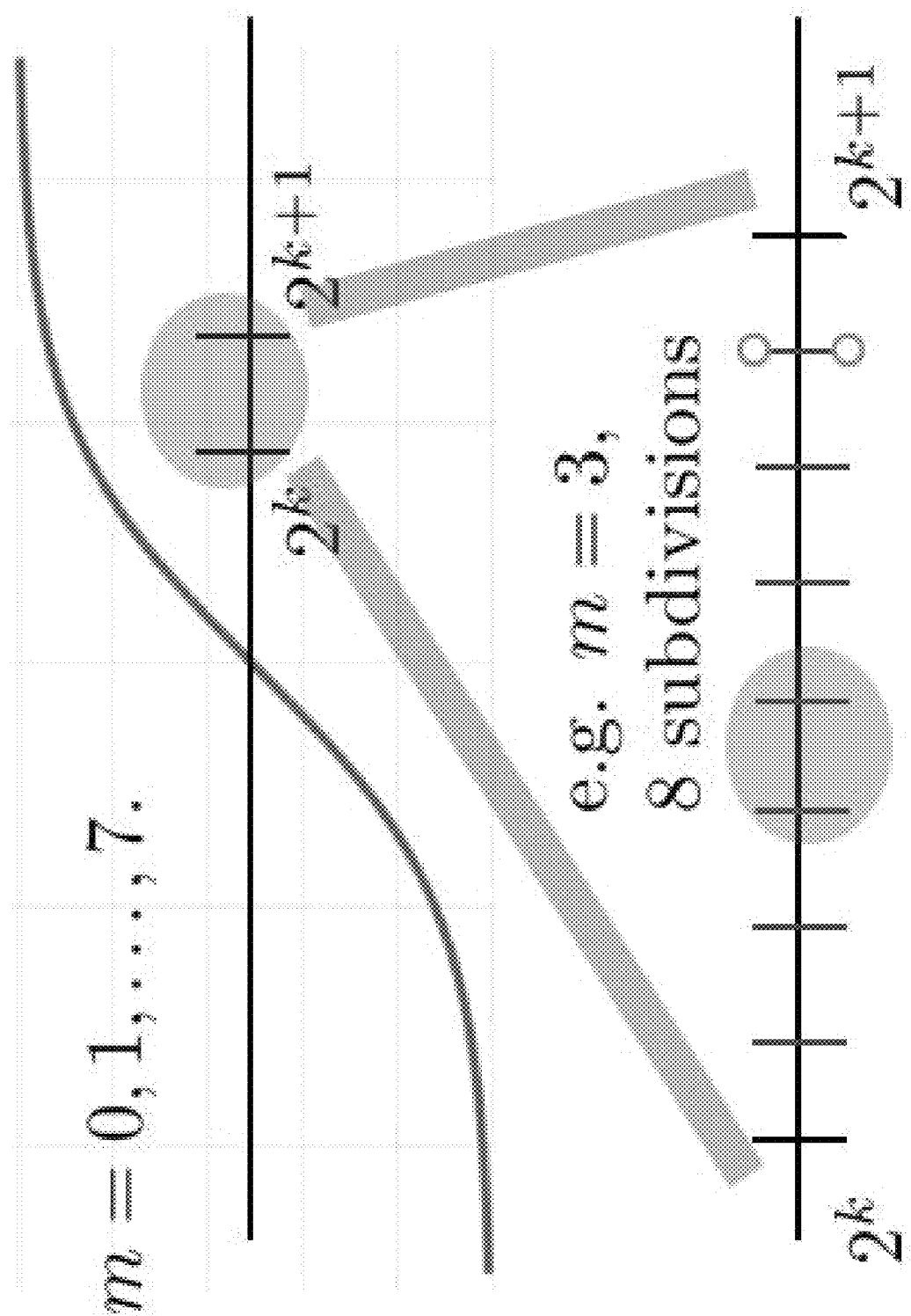
FIG. 1 illustrates an example programmed method for dividing the domain of a non-linear function into intervals and subintervals for approximation by low-level polynomials.

FIG. 1 illustrates an example programmed method for dividing the domain of a non-linear function into intervals and subintervals for approximation by low-level polynomials.

In the illustration of FIG. 1, a given binary interval may be identified by choosing a specific value of k. For example, k=1 identifies the binary interval from $2^\wedge1$ to $2^\wedge(1+1)$ which is [2, 4). In an embodiment, the identified binary interval may be divided into $2^\wedge m$ equal subintervals, where m=0, 1, . . . , 7. Thus, in an embodiment, no binary interval may be divided into more than $2^\wedge7=128$ equal subintervals (due to hardware constraints). The more subintervals a binary interval is divided into, the more accurately a polynomial model may approximate the target non-linear function in that binary interval, because a different set of model parameters for the polynomial model may be chosen in each of the subintervals, leading to a piecewise combination of model functions that hews more closely to the target non-linear function across the identified interval. FIG. 1 illustrates choosing m=3 ($2^\wedge3=8$ subintervals).

In embodiments, each binary interval of an input domain may be broken into subintervals, each subinterval defined by a pair of "breakpoints" corresponding to the bounds of that subinterval. In embodiments, each of the 64 unique (sgn, expo) of an FP 16 number may be used as breakpoints. These breakpoints may thus define binary intervals such as (−8, −4], (−4, −2], [1,2). [4,8), etc. Other breakpoints may be specified, subject to constraints on configuration tablespace available in an implemented configurable ASIC or FPGA non-linear compute unit. Additionally, a breakpoint near any FP 16 input number X may be thought of as a seed, S. In an embodiment, because X is in FP 16 format, X can be usefully decomposed into x+S. This decomposition may be useful, for example, because of the property that the EXP of a sum is equal to the product of the EXP [e.g., EXP(X)= EXP(S+x)=EXP(S)*EXP(x)]. Other embodiments may specify subintervals differently or may specify a different number of subintervals.

Figure 2:
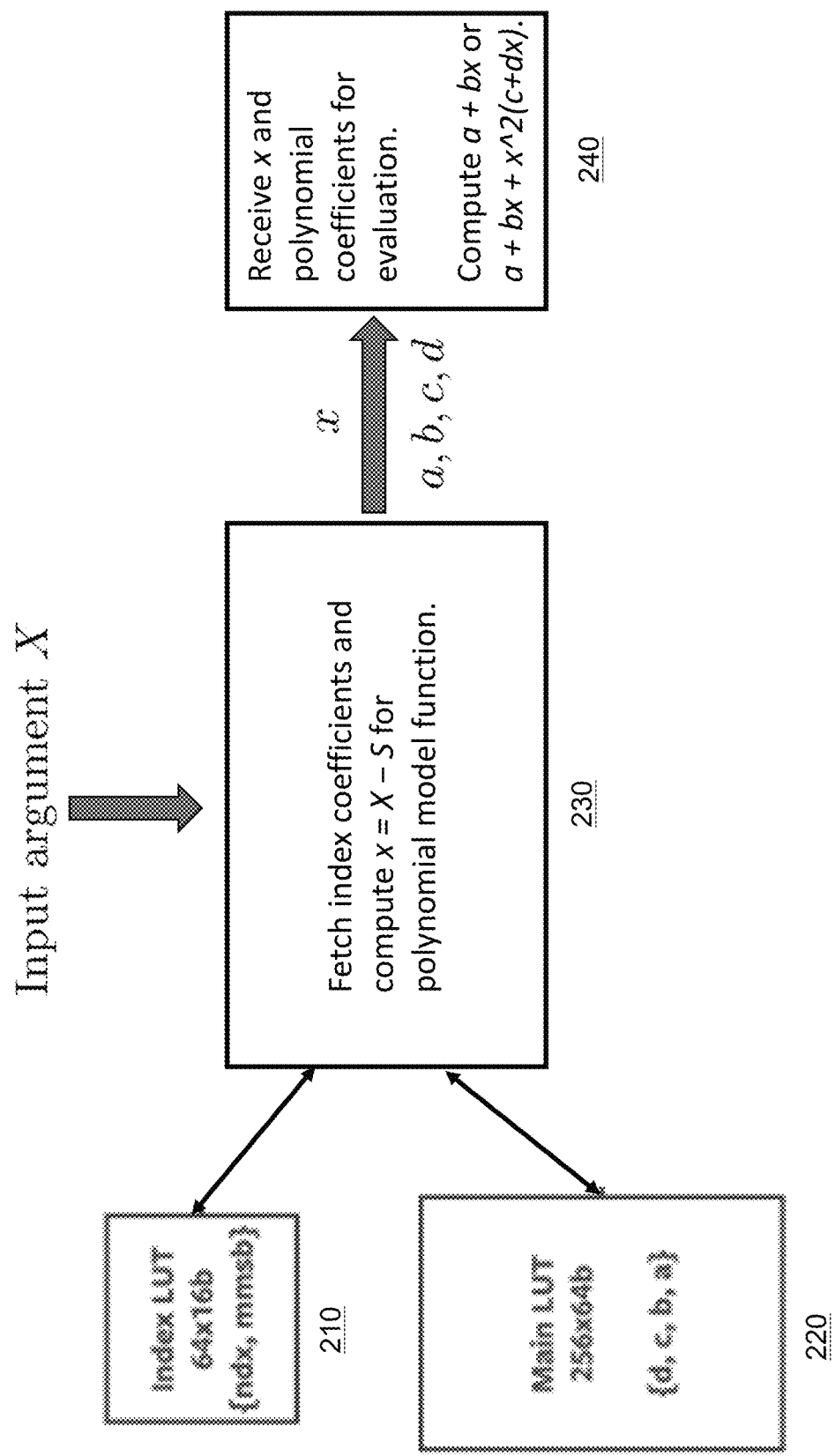
FIG. 2 illustrates an example structural/functional diagram of an architecture upon which one embodiment of the disclosed technology could be implemented.

FIG. 2 illustrates an example structural/functional diagram of an architecture upon which one embodiment of the disclosed technology could be implemented. In FIG. 2, in an embodiment, an SFU of an ASIC or FPGA comprises an Index Lookup Table (Index LUT) 210 and a Main Lookup Table (Main LUT) 220.

The Index LUT 210 may be a table containing rows of values, each row comprising index configuration parameters of the form (ndx, mmsb); ndx may be an index number pointing to a specific row in the Main LUT 220; and, given an input number X that falls within a certain binary interval corresponding to ndx, mmsb may represent an amount of equal subinterval divisions of that binary interval. Typically, the more subintervals the binary interval is subdivided into, the lower the overall approximation error will be in that binary interval, as the implemented linear or cubic model may then, in the subintervals, hew more closely to the non-linear function being approximated. In embodiments, mmsb may be of the form m=0, 1, 2, . . . 7 denoting subdivision into $2^m$ subintervals. Each of the 8 possible values of m for a certain binary interval may represent a possible configuration for that interval. In embodiments, Index LUT 210 has 64 rows, corresponding to the number of unique (sgn, expo) of an FP 16 number and further corresponding to the certain binary interval. In embodiments, the Index LUT 210 may have a different number of rows or mmsb may be of another form. In embodiments, X may be in a binary format other than FP 16 or a non-binary format.

The Main LUT 220 may be a table containing rows of values, each row comprising model parameters of the form {a, b} [for linear modeling of non-linear functions] or {a, b, c, d} [for cubic modeling of non-linear functions]. Each row of the Main LUT 220 may be configured with model parameters calculated to approximate a certain non-linear function in a single subinterval corresponding to that row. In an embodiment, the Main LUT 220 is designed to have more rows than the Index LUT 210. For example, if the Index LUT 210 has 64 rows, then the Main LUT 220 may have 256 rows. In other embodiments, the Main LUT 220 may instead have a different number of rows.

In embodiments, the architecture may be configured to approximate the non-linear function at X (an FP 16 number) by first determining the subinterval that X falls within and a corresponding seed S, second computing x=X−S, third retrieving the corresponding coefficients (model parameters) of the local polynomial model corresponding to the subinterval that X falls within, and fourth evaluating that polynomial at X using x and the retrieved coefficients.

In FIG. 2, in an embodiment, a first logic block 230 is configured to receive an input X and fetch corresponding index information {ndx, mmsb} from the Index LUT 210 and corresponding local polynomial coefficients {a, b} or {a, b, c, d} from the Main LUT 220. In an embodiment, the first logic block 230 fetches the {ndx, mmsb} from the $i^{th}$ row of the Index LUT 210, where i=(sgn, expo) of X. In an embodiment, mmsb indicates how many subintervals are used inside the binary interval identified by i. The coefficients of the polynomial for these subintervals may be stored contiguously in the Main LUT at a starting address pointed to by ndx.

In an embodiment, the first logic block 230 then computes x=X−S, after determining the subinterval that X falls within and the corresponding seed S. Thus, x may be thought of as the input as measured relative to the beginning of the selected subinterval, whereas X may be thought of as the input measured from 0. For example, if X=83, then the closest binary interval might start at 64 (wherein said interval spans from $2^{\wedge}6=64$ to $2^{\wedge}7=128$). Then, the seed S might be 64. In that case, x could be 19 (because 83−64=19).

In an embodiment, the first logic block 230 then fetches the polynomial coefficients from the Main LUT 220 based on the fetched {ndx, mmsb}, wherein the row of the Main LUT 220 from which the polynomial coefficients are fetched may be calculated as ndx+(p−1), where X falls within the $p^{th}$ subinterval of the binary interval containing X, and p={1, 2, 3, . . . , $2^{\wedge mmsb}$}.

In FIG. 2, in an embodiment, a second logic block 240 receives x and the fetched polynomial coefficients and evaluates a model polynomial of either the form (a+bx) or $(a+bx)+x^2(c+dx)$ for use in approximating the desired non-linear function at X. The second logic block 240 may comprise sub-units such as multipliers, adders, or other sub-units for polynomial evaluation.

Automatic Non-linear Compute Configuration Techniques

A novel method for automatic configuration of a non-linear compute unit or SFU of an ASIC or FPGA may be carried out by executing a series of optimization procedures in a multi-level structure to produce optimal configuration parameters for a desired non-linear function. In an embodiment, ASIC or FPGA hardware provides a baseline subdivision of an input domain I into subintervals $I_i$, i=1, 2, . . . , I. For each I, the hardware may allow $m_i$, subdivision configurations. In other words, $I_i$ may be partitioned in one of $m_i$ ways into sets of disjoint subintervals. Thus, a subdivision configuration of the entire input domain may be determined by {(i, $m_i$|=1, 2, . . . , I}.

In an embodiment, further based on the ASIC or FPGA design, there may be a known cost (resource consumption) $C_{i,mi}$ for the choice of $m_i$ for $I_i$. This cost may be primarily associated with the availability of memory, tablespace, or table size. The task of configuring a non-linear function may be defined as picking $m_i$ such that a total cost $$\sum_{i=1}^{I} c_{i,m_i} \leq C$$

stays within a budget C while some other properties are being optimized. These properties may relate to an accuracy of approximation of an implemented model function to a desired non-linear function (such as an activation function used in machine learning).

In an embodiment, a first stage of the novel automatic configuration method involves automatically generating a Cost-Error table. For each i=1, 2 . . . , I a corresponding $c_{i,m_i}$ may first be obtained based on ASIC or FPGA design specifications. For each i and $m_i$, $I_i$ may be partitioned into $L_{m_i}$, a set (s, [$x_0$, $x_1$]) of breakpoints s and (disjoint) intervals [$x_0$, $x_1$] per the ASIC or FPGA design. For each such tuple, a numerical optimization procedure may be employed to obtain an optimal polynomial approximation to the desired non-linear function by solving $$e^*_{(s,[x_0,x_1])} = \min_p \max_{x \in [x_0,x_1]} |p(x) - F(s+x)|$$

In an embodiment, solving the aforementioned optimal polynomial approximation problem may determine a "best" approximating polynomial for each of every possible sub-interval. In an embodiment, "best" may be defined as minimizing the maximum distance between the approximating polynomial and the desired non-linear function in terms of units of last place, ULP: the unit of last place in the FP 16 representation of a value y where $2\wedge <= |y| < 2\wedge(k+1)$ is $2\wedge(k-10)$ for y not subnormal; otherwise ULP may be $2\wedge(-24)$. As an example only, the described weighted minimax approximation problem may be solved by casting it as a linear programming problem and programmatically employing a Simplex Method. Other standard methods may be programmatically implemented instead of the Simplex Method (also known as the Simplex algorithm of Dantzig), including a criss-cross algorithm, one of various interior point methods, or another technique known in the art.

After solving the optimal polynomial approximation problem through the Simplex Method or by another method, then a Cost-Error table may be populated into ($c_{i,m_i}$, $e_{i,m_i}$), where $$e_{i,m_i} = \max_{(s,[x_0,x_1]) \in P_{m_i}} e^*_{(s,[x_0,x_1])}$$

FIG. 3 illustrates an example form of a Cost-Error table which may digitally store $e_{i,m}$ which is the minimax error over all the $2^m$ subintervals for binary interval $I_i$.

In embodiments, to avoid ill conditioning that may stem from operating on very narrow subintervals, the novel automatic configuration method involves performing interpolation on Chebyshev nodes numbering 2 plus the polynomial degree before programmatically solving the linear program for an optimal minimax approximation in stage one. The resulting linear system may be, in general, well-conditioned. If the resulting approximation error is very small (per a preset threshold), then the method may involve accepting the interpolation polynomial and bypassing the linear programming solution for an optimal minimax approximation altogether. In embodiments, for a given binary interval, the method may then involve finding best approximating polynomials for m=0,1, up to 7 in ascending order, for only as long as the resulting minimax error at the latest m value is not very small.

In an embodiment, a second stage of the novel automatic configuration method involves automatically finding a feasible configuration that minimizes the worst-case error across the binary intervals, based on the populated Cost-Error table. In an embodiment, this second stage optimization procedure may be programmatically accomplished using binary search to solve a constrained optimization problem formulated as finding $m_1, m_2, \ldots, m_D$ to minimize $$E^*_1 = \min_{(i,m_i)} \max e_{i,m_i}$$

$$\text{subject to } \sum_{i,m_i} c_{i,m_i} \leq C$$

where 0 and $$\max_i e_{i,m_i}$$

are the lower and upper bound of the optimal error, respectively. And midpoints of any such bounds can easily be programmatically determined to be a lower or upper bound using the Cost-Error table information, the bounds updated, and iterated.

In some instances, the optimal minimax configuration generated in the second stage may not exhaust the tablespace available in the ASIC or FPGA for storing coefficients. Thus, a third (L-1) optimization procedure may be employed to minimize the sum of all binary interval worse case errors subject to not increasing the (L-infinity) lowest minimax error on the entire domain which was found in the second stage.

Thus, in an embodiment, a third stage of the novel automatic configuration method involves automatically optimizing the configuration such that while the minimax error remains E, the sum of max error of each binary interval is also minimized. In an embodiment, this third stage optimization procedure may be programmatically accomplished using dynamic programing to solve another constrained optimization problem. Let L(d, t) denote the solution of finding $m_1, m_2, \ldots, m_d$ and to minimize $$\sum_{i=1}^d e_{i,m_i}$$

subject to $$\max_{i=1}^d e_{i,m_i} \leq E$$

and $$\sum_{i=1}^d 2^{m_i} \leq t.$$

What is desired is L(D, T) and arguments $m_i$, $1 \leq i \leq D$.
First, L(1, t) may be solved for $1 \leq t \leq T$.
Then, L(i, s)=∞ may be defined for all s≤0, noting that $$\mathcal{L}(d, t) = \min_{m_d} \{e_{d,m_d} + \mathcal{L}(d-1, t - 2^{m_d})\}$$

In other embodiments, the optimization problem of the third stage may instead be solved using integer linear programming (ILP).

Thus, at the end of stages one to three, the novel automatic configuration method may programmatically obtain an optimal configuration using only information related to the ASIC or FPGA resource constraints and allowable division configurations, together with a computer program configured to return an accurate F(x) [for the desired non-linear function] given an arbitrary input value x.

In an embodiment, now that the optimal configuration has been programmatically determined (the m values for each interval are known and the polynomial model function coefficients for each subinterval are known), the lookup tables can be automatically configured for accurate approximation. In an embodiment, the Index LUT may be configured with the m values specifying the number of intervals for each binary interval and the Main LUT may be configured with the previously calculated polynomial coefficients. Subsequently, the hardware shown in FIG. 2 could be used to compute the non-linear function.

Figure 4:
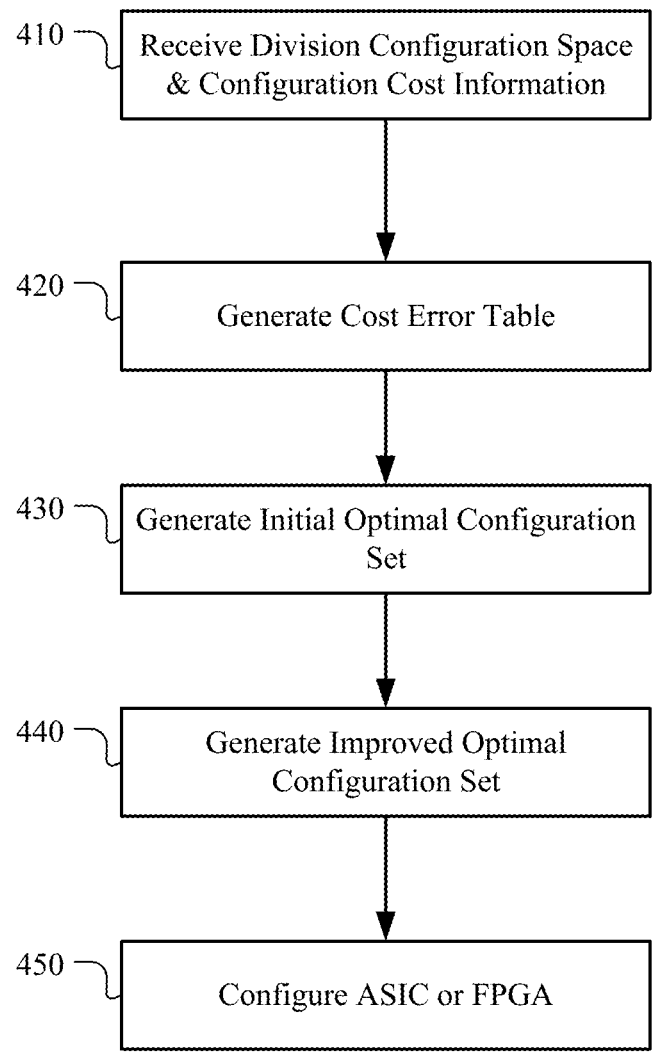
FIG. 4 illustrates an example method for automatically configuring an ASIC or FPGA.

FIG. 4 illustrates an example method 400 for automatically configuring an ASIC or FPGA. In an embodiment, the computer-implemented method begins at step 410 where it receives, as input, ASIC or FPGA information that defines a division configuration space and configuration costs. The computer-implemented method 400 may then proceed through three stages. The method 400 may continue to step 420, in a first stage, where a Cost-Error table may be digitally generated, wherein each row of the table is associated with a particular interval $I_i$ in the input domain, and each entry in the row represents the error of a particular configuration of subintervals $2^{\wedge}m$ used to subdivide interval $I_i$. Each entry of each row of the table may be an error measured between the implemented functions with optimized parameters and the desired function in the $2^{\wedge}m$ subintervals within the interval $I_i$. The optimized parameters may be found by solving a weighted minimax approximation problem by linear programming. At step 430, in a second stage, a best subdivision scheme may be found for each interval $I_i$ (i.e., finding the best $2^{\wedge}m$ to subdivide each interval), wherein the best scheme is considered to be the one that minimizes the worst-case binary interval errors. This best scheme may be found by solving a constrained optimization problem by binary search, with the constraint being, e.g., the size of a look-up table or memory for storing the hardware configurations. This best scheme may be characterized as an initial optimal configuration set. At step 440, in a third stage, the sum of the errors may be minimized by solving another constrained optimization problem by dynamic programming. The result of minimizing the sum of the errors may be an improved subdivision scheme which may be characterized as an improved optimal configuration set. Finally, at step 450, the computer-implemented method 400 may return an optimal configuration of the ASIC or FPGA as output or automatically configure the ASIC or FPGA. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for automatically configuring an ASIC or FPGA including the particular steps of the method of FIG. 4, this disclosure contemplates any suitable method for automatically configuring an ASIC or FPGA including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Artificial Neural Networks

Figure 5:
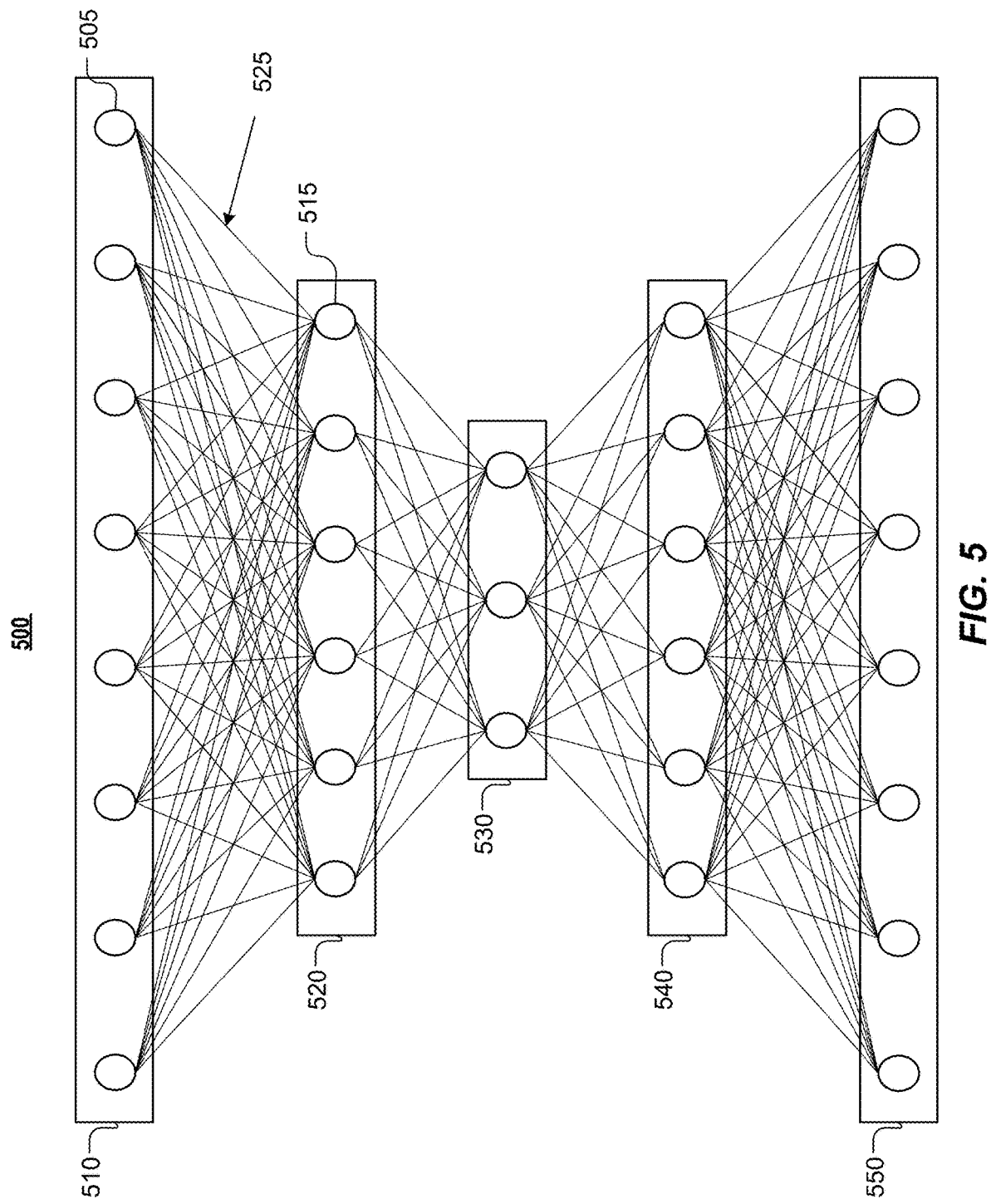
FIG. 5 illustrates an example artificial neural network.

FIG. 5 illustrates an example artificial neural network ("ANN") 500. In particular embodiments, an ANN may refer to a computational model comprising one or more nodes. Example ANN 500 may comprise an input layer 510, hidden layers 520, 530, 540, and an output layer 550. Each layer of the ANN 500 may comprise one or more nodes, such as a node 505 or a node 515. In particular embodiments, each node of an ANN may be connected to another node of the ANN. As an example and not by way of limitation, each node of the input layer 510 may be connected to one of more nodes of the hidden layer 520. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 5 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 5 depicts a connection between each node of the input layer 510 and each node of the hidden layer 520, one or more nodes of the input layer 510 may not be connected to one or more nodes of the hidden layer 520.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 520 may comprise the output of one or more nodes of the input layer 510. As another example and not by way of limitation, the input to each node of the output layer 550 may comprise the output of one or more nodes of the hidden layer 540. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)$=max $(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 525 between the node 505 and the node 515 may have a weighting coefficient of 0.4, which may indicate that 0.4 multiplied by the output of the node 505 is used as an input to the node 515. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 500 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Systems and Methods

Figure 6:
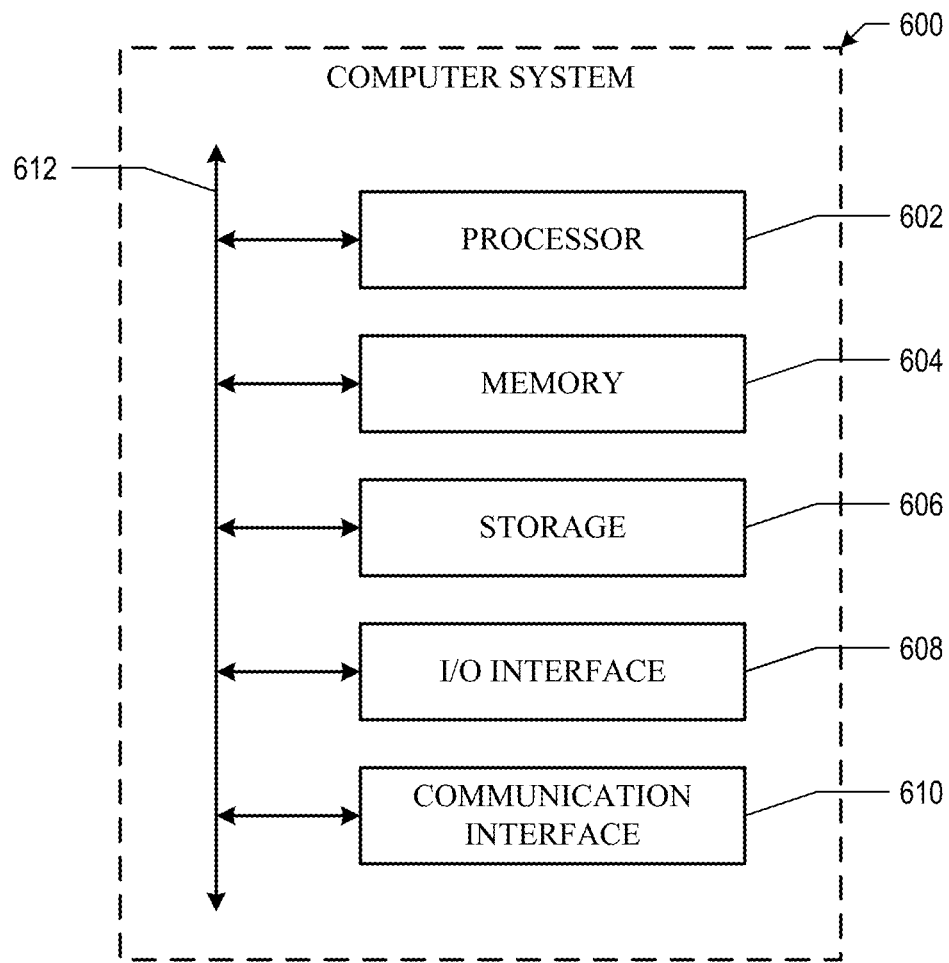
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method for configuring a hardware accelerator to perform a non-linear function, comprising:
    determining a plurality of intervals that partition an input domain of the non-linear function;
    determining, for each of the intervals, a plurality of subinterval configurations corresponding to different numbers of subintervals for partitioning that interval;
    generating an error set comprising, for each of the subinterval configurations of each of the intervals, an error for using a polynomial function to approximate the non-linear function within one or more corresponding subintervals specified by the subinterval configuration;
    using the error set,
        selecting one of the subinterval configurations for each of the intervals to generate a configuration set that minimizes a worst-case error across the intervals without exceeding resource constraints of the hardware accelerator; and
        selecting one of the subinterval configurations for each of the intervals to generate an improved configuration set that minimizes a cumulative error across the intervals without exceeding the worst-case error; and
    configuring the hardware accelerator based on the improved configuration set.

2. The method of claim 1, wherein:
    the plurality of intervals that partition the input domain of the non-linear function are disjoint binary intervals; and
    the one or more corresponding subintervals respectively specified by each of the subinterval configurations are of equal size.

3. The method of claim 1, further comprising:
    storing, in an index look-up-table, for each of the intervals, the selected one of the subinterval configurations used to generate the improved configuration set; and
    storing, in a main look-up-table, for each subinterval specified by the subinterval configurations stored in the index look-up-table, a set of polynomial function coefficients defined by the improved configuration set;
    wherein the resource constraints define a maximum index look-up-table size and a maximum main look-up-table size.

4. The method of claim 1, wherein the non-linear function comprises one of a sigmoid function, a Swish function, a hyperbolic tangent (Tanh) function, a Gaussian Error Linear Unit (GELU) function, or a rectifier function.

5. The method of claim 1, wherein the resource constraints of the hardware accelerator scale linearly with a number of parameters of the polynomial function.

6. The method of claim 1, further comprising receiving information defining a division configuration space and configuration costs, the received information including the resource constraints.

7. The method of claim 3, wherein the index look-up-table and the main look-up-table are stored in a special function unit of a processing element of an application-specific integrated circuit (ASIC).

8. The method of claim 6, wherein:
    the error set is generated using linear programming;
    the configuration set is generated using binary search; and
    the improved configuration set is generated using dynamic programming.

9. One or more computer-readable non-transitory storage media embodying software that is operable when executed to perform a method, the method comprising:
    determining a plurality of intervals that partition an input domain of a non-linear function;
    determining, for each of the intervals, a plurality of subinterval configurations corresponding to different numbers of subintervals for partitioning that interval;

generating an error set comprising, for each of the subinterval configurations of each of the intervals, an error for using a polynomial function to approximate the non-linear function within one or more corresponding subintervals specified by the subinterval configuration; using the error set,
 selecting one of the subinterval configurations for each of the intervals to generate a configuration set that minimizes a worst-case error across the intervals without exceeding resource constraints of a hardware accelerator; and
 selecting one of the subinterval configurations for each of the intervals to generate an improved configuration set that minimizes a cumulative error across the intervals without exceeding the worst-case error; and
configuring the hardware accelerator based on the improved configuration set.

10. The media of claim 9, wherein:
the plurality of intervals that partition the input domain of the non-linear function are disjoint binary intervals; and
the one or more corresponding subintervals respectively specified by each of the subinterval configurations are of equal size.

11. The media of claim 9, the method further comprising:
storing, in an index look-up-table, for each of the intervals, the selected one of the subinterval configurations used to generate the improved configuration set; and
storing, in a main look-up-table, for each subinterval specified by the subinterval configurations stored in the index look-up-table, a set of polynomial function coefficients defined by the improved configuration set;
wherein the resource constraints define a maximum index look-up-table size and a maximum main look-up-table size.

12. The media of claim 9, wherein the non-linear function comprises one of a sigmoid function, a Swish function, a hyperbolic tangent (Tanh) function, a Gaussian Error Linear Unit (GELU) function, or a rectifier function.

13. The media of claim 9, wherein the resource constraints of the hardware accelerator scale linearly with a number of parameters of the polynomial function.

14. The media of claim 9, the method further comprising receiving information defining a division configuration space and configuration costs, the received information including the resource constraints.

15. The media of claim 11, wherein the index look-up-table and the main look-up-table are stored in a special function unit of a processing element of an application-specific integrated circuit (ASIC).

16. The media of claim 14, wherein:
the error set is generated using linear programming;
the configuration set is generated using binary search; and
the improved configuration set is generated using dynamic programming.

17. A system comprising: one or more processors; and a non-transitory memory coupled to the processors comprising instructions executable by the processors, the processors operable when executing the instructions to perform a method, the method comprising:
determining a plurality of intervals that partition an input domain of a non-linear function;
determining, for each of the intervals, a plurality of subinterval configurations corresponding to different numbers of subintervals for partitioning that interval;
generating an error set comprising, for each of the subinterval configurations of each of the intervals, an error for using a polynomial function to approximate the non-linear function within one or more corresponding subintervals specified by the subinterval configuration; using the error set,
 selecting one of the subinterval configurations for each of the intervals to generate a configuration set that minimizes a worst-case error across the intervals without exceeding resource constraints of a hardware accelerator; and
 selecting one of the subinterval configurations for each of the intervals to generate an improved configuration set that minimizes a cumulative error across the intervals without exceeding the worst-case error; and
configuring the hardware accelerator based on the improved configuration set.

18. The system of claim 17, wherein:
the plurality of intervals that partition the input domain of the non-linear function are disjoint binary intervals; and
the one or more corresponding subintervals respectively specified by each of the subinterval configurations are of equal size.

19. The system of claim 17, the method further comprising:
storing, in an index look-up-table, for each of the intervals, the selected one of the subinterval configurations used to generate the improved configuration set; and
storing, in a main look-up-table, for each subinterval specified by the subinterval configurations stored in the index look-up-table, a set of polynomial function coefficients defined by the improved configuration set;
wherein the resource constraints define a maximum index look-up-table size and a maximum main look-up-table size.

20. The system of claim 19, wherein the index look-up-table and the main look-up-table are stored in a special function unit of a processing element of an application-specific integrated circuit (ASIC).

* * * * *